United States Patent [19]
Plocher

[11] Patent Number: 5,930,683
[45] Date of Patent: Jul. 27, 1999

[54] COMMUNICATION SYSTEM FOR PREVENTING INTERFERENCE BETWEEN WIRELESS DEVICES

[75] Inventor: Peter H. Plocher, Duluth, Ga.

[73] Assignee: NCR Corporation, Dayton, Ohio

[21] Appl. No.: 08/721,603

[22] Filed: Sep. 25, 1996

[51] Int. Cl.[6] .................................................. H04B 15/00
[52] U.S. Cl. ............................................. 455/62; 455/63
[58] Field of Search .................................. 455/9, 10, 501, 455/504, 62, 63, 103, 553; 340/825.35, 825.55; 235/383

[56] References Cited

U.S. PATENT DOCUMENTS

| | | | |
|---|---|---|---|
| 4,002,886 | 1/1977 | Sundelin | 235/61.7 R |
| 4,479,215 | 10/1984 | Baker | 455/62 |
| 4,500,880 | 2/1985 | Gomersall et al. | 340/825.35 |
| 4,578,815 | 3/1986 | Persinotti | 455/62 |
| 4,736,453 | 4/1988 | Schloemer | 455/62 |
| 4,780,885 | 10/1988 | Paul et al. | 455/62 |
| 4,924,363 | 5/1990 | Kornelson | 362/125 |
| 5,172,314 | 12/1992 | Poland et al. | 364/401 |
| 5,416,829 | 5/1995 | Umemoto | 455/553 |
| 5,448,226 | 9/1995 | Failing, Jr. et al. | 340/825.35 |
| 5,550,893 | 8/1996 | Heidari | 455/553 |
| 5,701,590 | 12/1997 | Fujinami | 455/62 |

FOREIGN PATENT DOCUMENTS 1374435  2/1988  U.S.S.R. .

*Primary Examiner*—Edward F. Urban
*Attorney, Agent, or Firm*—Paul W. Martin

[57] ABSTRACT

A communication system which uses a multi-mode transmitter to communicate in a serial fashion with first and second wireless devices. The system includes a transmitter, a first transmitter control circuit which allows the transmitter to communicate with a first communication device, a second transmitter control circuit which allows the transmitter to communicate with a second communication device, a first receiver circuit which receives signals from the first communication device, a second receiver circuit which receives signals from the communication device, and a switch circuit. In one embodiment, the system additionally includes a controller coupled to the first and second receiver circuits which causes the switch circuit to select the first transmitter control circuit during a first time period and the second transmitter control circuit during a second time period different than the first time period.

11 Claims, 2 Drawing Sheets

5,930,683

COMMUNICATION SYSTEM FOR PREVENTING INTERFERENCE BETWEEN WIRELESS DEVICES

BACKGROUND OF THE INVENTION

The present invention relates to wireless communication devices, and more specifically to a communication system which prevents interference between wireless devices.

In today's retail environment, there may be many different types of wireless devices, such as wireless data terminals, wireless hand-held scanners, wireless electronic shelf labels, and wireless voice products. Unfortunately, some of these devices may utilize the same RF spectrum, resulting in interference. One of the bands most often used today is the Industrial, Scientific and Medical (ISM) band.

Therefore, it would be desirable to provide a communication system that could eliminate interference between wireless devices.

SUMMARY OF THE INVENTION

In accordance with the teachings of the present invention, a communication system which prevents interference between wireless devices is provided.

The system includes a transmitter, a first transmitter control circuit which allows the transmitter to communicate with a first communication device, a second transmitter control circuit which allows the transmitter to communicate with a second communication device, a first receiver circuit which receive signals from the first communication device, a second receiver circuit which receives signals from the communication device, and a switch circuit.

In a first embodiment, the system additionally includes a first controller coupled to the first receiver circuit and to the first transmitter control circuit which causes the switch circuit to select the first transmitter control circuit during a first time period, and a second controller coupled to the second receiver circuit and to the second transmitter control circuit which causes the switch circuit to select the second transmitter control circuit during a second time period different than the first time period.

In a second embodiment, the system additionally includes a controller coupled to the first and second receiver circuits which causes the switch circuit to select the first transmitter control circuit during a first time period and the second transmitter control circuit during a second time period different than the first time period.

In either embodiment, switching may be controlled by the wireless devices or by first and second host systems that use the transmitter to communicate with the wireless devices. When the host systems initiate communications with the first and second wireless devices, the controller or the first and second host systems change the switch accordingly. When the first and second wireless devices initiate communications with the first and second host systems, the controller or the first and second host systems also change the switch accordingly.

It is accordingly an object of the present invention to provide a communication system which does not suffer from interference between wireless devices.

It is another object of the present invention to provide a communication system which does not suffer from interference between wireless devices, and which includes a multi-mode transceiver.

It is another object of the present invention to provide a communication system which does not suffer from interference between wireless devices, and which includes a multi-mode transceiver with a multi-mode transmitter portion that operates in only one mode at a time.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
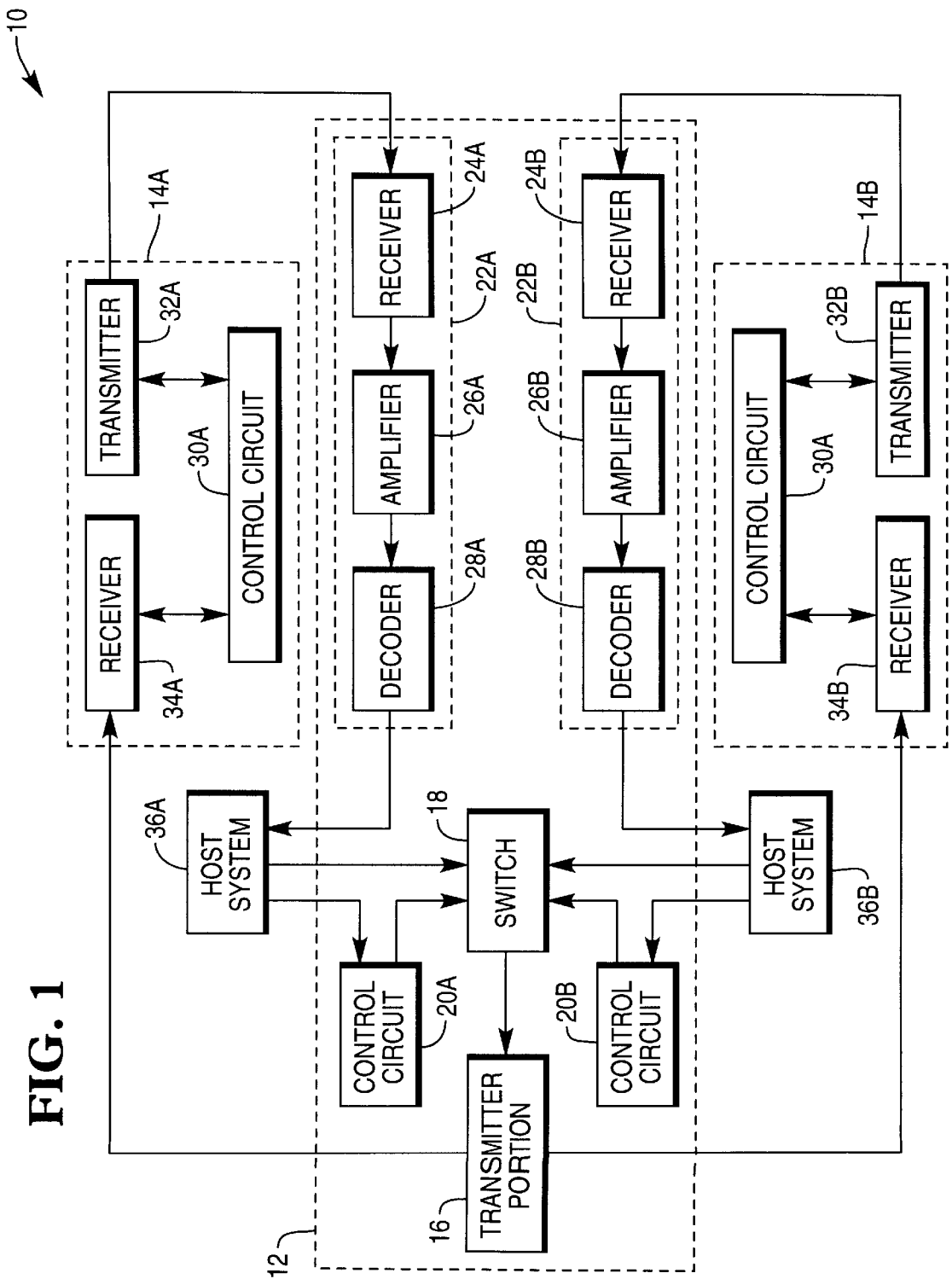
FIG. 1 is a block diagram of a first embodiment of the communication system of the present invention.

Referring now to the Drawings, communication system 10 includes multi-mode transceiver 12, wireless communication devices 14a and 14b, and host systems 36a and 36b.

Multi-mode transceiver 12 transmits and receives messages from wireless communication devices 14a and 14b, even through devices 14a and 14b may be operating at different frequencies, in different transmission modes, or in overlapping bandwidths. Multi-mode transceiver 12 includes transmitter portion 16, switch 18, control circuits 20a and 20b, and receiver circuits 22a and 22b.

Transmitter portion 16 transmits messages to wireless communication devices 14a and 14b. Transmitter portion 16 produces an output signal whose frequency and signal characteristics are controlled by control circuits 20a or 20b.

Switch 18 connects one of control circuits 20a or 20b to transmitter portion 16. An analog RF switch is suitable for use as switch 18.

Control circuit 20a and 20b control the output signal frequency and signal characteristics of transmitter portion 16. Control circuits 20a and 20b receive information for transmission from host systems 36a and 36b.

In prior systems having a plurality of transmitters, each transmitter has its own control circuit. The present invention separates control circuits 20a and 20b from transmitter portion 16 by switch 18. Thus, transmitter portion 16 can transmit to only one of devices 14a or 14b at a time. Interference between transmitters is eliminated because only one transmitter 12 is in use.

Receiver circuits 22a and 22b receive incoming information signals from devices 14a and 14b and forward the information to host systems 36a and 36b. Operation of transceiver 12 assumes that device 14a initiates communication with host system 36a, and that host system 36b initiates communication with device 14b. However, the present invention may be modified to accommodate any combination of controlling schemes.

Receiver circuits 22a and 22b include receivers 24a and 24b, amplifiers 26a and 26b, and decoders 28a and 28b.

Receivers 24a and 24b receive signals from devices 14a and 14b.

Amplifiers 26a and 26b amplify the signals received by receivers 24a and 24b.

Decoders 28a and 28b decode the information from the amplified signals.

Devices 14a and 14b include control circuits 30a and 30b, transmitters 32a and 32b, and receivers 34a and 34b.

Devices 14a and 14b are preferably different types of wireless devices. They may include any combination of wireless data terminals, wireless hand-held scanners, wireless electronic shelf labels, and wireless voice products. There may be many such devices and their associated control circuits (e.g., 20a and 20b), receiver circuits (e.g., 22a and 22b), and host systems (e.g., 36a and 36b) in system 10, but only two are shown for clarity.

Using transceiver 12, host systems 36a and 36b provide information for transmission to devices 14a and 14b and receive information from devices 14a and 14b. Additionally, host systems 36a and 36b sample the output signals from decoders 28a and 28b to control operation of switch 18 to initiate transmission. Host systems 36a and 36b relinquish control over switch 18 when transmission of their information is finished.

Figure 2:
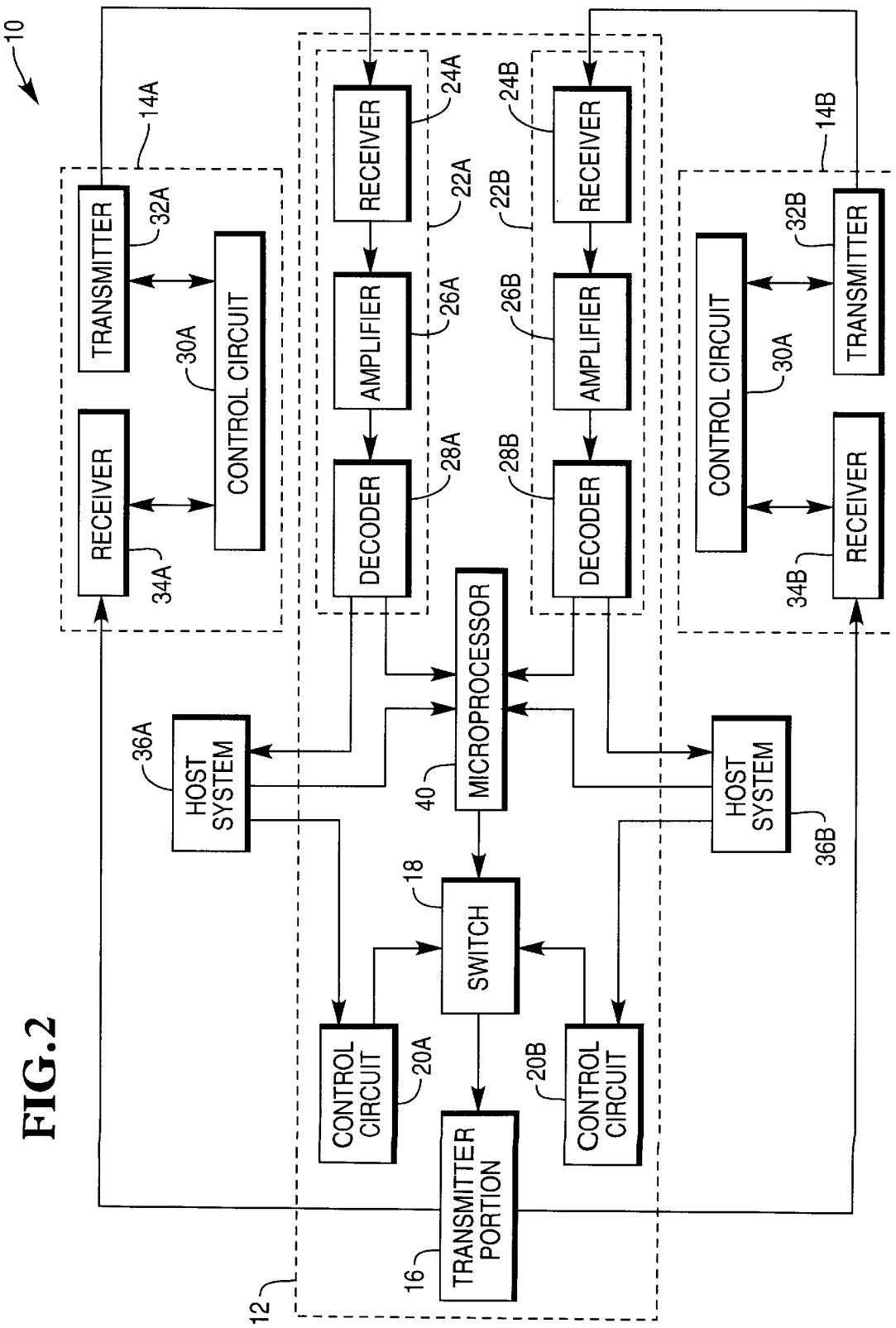
FIG. 2 is a block diagram of a second embodiment of the communication system of the present invention.

With reference to FIG. 2, a single microprocessor 40 controls switch 18 instead of host systems 36a and 36b. As in the first embodiment, switching may be controlled by host systems 36a and 36b or devices 14a and 14b. When host systems 36a and 36b initiate communication with devices 22a and 22b, microprocessor 40 receives a signal from host systems 36a and 36b and changes switch 18 accordingly. When wireless devices 14a and 14b initiate communication with host systems 36a and 36b, microprocessor 40 receives a signal from receivers 22a and 22b and changes switch 18 accordingly.

Although the present invention has been described with particular reference to certain preferred embodiments thereof, variations and modifications of the present invention can be effected within the spirit and scope of the following claims.

What is claimed is:

1. A communication system in a transaction establishment comprising:
   a transmitter in the transaction establishment which communicates with a plurality of different communication devices operated within the transaction establishment having overlapping bands of communication;
   a plurality of transmitter control circuits which control the transmitter;
   a switch circuit which selects a single transmitter control circuit at a time to prevent interference between the communication devices;
   a plurality of different receiver circuits which receive signals from the different communication devices within the transaction establishment; and
   a number of controllers coupled to the plurality of receiver circuits and to the plurality of transmitter control circuits which control the switch in response to the received signals circuit.

2. The communication system as recited in claim 1, wherein the number of controllers comprises one.

3. The communication system as recited in claim 1, wherein the switch circuit selects a single transmitter control circuit upon receipt of signals from the different communication devices by the controllers.

4. The communication system as recited in claim 1, wherein one of the communication devices comprises a wireless electronic shelf label.

5. The communication system as recited in claim 1, wherein one of the communication devices comprises a wireless data terminal.

6. The communication system as recited in claim 1, wherein one of the communication devices comprises a wireless hand-held scanner.

7. The communication system as recited in claim 1, wherein one of the communication devices comprises a wireless voice transceiver.

8. A communication system in a transaction establishment comprising:
   a transmitter in the transaction establishment which communicates with first and second different communication devices operated within the transaction establishment having overlapping bands of communication;
   a first transmitter control circuit which controls the transmitter;
   a second transmitter control circuit which controls the transmitter;
   a first receiver circuit within the transaction establishment which receive signals from the first communication device;
   a second receiver circuit within the transaction establishment which receive signals from the second communication device;
   a switch circuit which selects either the first transmitter control circuit during a first time period or the second transmitter control circuit during a second time period different from the first time period to prevent interference between the first and second communication devices;
   a first controller coupled to the first receiver circuit and to the first transmitter control circuit which controls the switch circuit during the first time period; and
   a second controller coupled to the second receiver circuit and to the second transmitter control circuit which controls the switch circuit during the second time period.

9. A communication system in a transaction establishment comprising:
   a transmitter in the transaction establishment which communicates with first and second different communication devices operated within the transaction establishment having overlapping bands of communication;
   a first transmitter control circuit which controls the transmitter;
   a second transmitter control circuit which controls the transmitter;
   a first receiver circuit within the transaction establishment which receives signals from the first communication device;
   a second receiver circuit within the transaction establishment which receives signals from the second communication device;
   a switch circuit which selects either the first transmitter control circuit during a first time period or the second transmitter control circuit during a second time period different from the first time period to prevent interference between the first and second communication devices; and
   a controller coupled to the first and second receiver circuits which controls the switch in response to the received signals circuit.

10. A transceiver for communicating with a plurality of different devices in a transaction establishment comprising:
   a transmitter in the transaction establishment which communicates with first and second different communication devices operated within the transaction establishment having overlapping bands of communication;
   a first transmitter control circuit which controls the transmitter;
   a second transmitter control circuit which controls the transmitter;

a first receiver circuit within the transaction establishment which receives signals from the first communication device;

a second receiver circuit within the transaction establishment which receives signals from the second communication device;

a switch circuit which selects either the first transmitter control circuit during a first time period or the second transmitter control circuit during a second time period different from the first time period to prevent interference between the first and second communication devices; and a controller coupled to the first and second receiver circuits which controls the switch in response to the received signals circuit.

11. A communication system in a transaction establishment comprising:

a transmitter in the transaction establishment which communicates with a plurality of different communication devices, including electronic shelf labels and portable communication devices, operated within the transaction establishment and having overlapping bands of communication;

a plurality of transmitter control circuits which control the transmitter;

a switch circuit which selects a single transmitter control circuit at a time to prevent interference between the electronic shelf labels and the portable communication devices;

a plurality of different receiver circuits within the transaction establishment which receive signals from electronic shelf labels and the portable communication devices; and a number of controllers coupled to the plurality of receiver circuits and to the plurality of transmitter control circuits which control the switch circuit.

* * * * *

UNITED STATES PATENT AND TRADEMARK OFFICE
CERTIFICATE OF CORRECTION

PATENT NO.    : 5,930,683
DATED         : July 27, 1999
INVENTOR(S)   : Peter H. Plocher It is certified that error appears in the above-identified patent and that said Letters Patent is hereby corrected as shown below:

Column 3,
Line 48, after "switch" insert -- circuit --.
Line 49, after "signals" delete "circuit".

Column 4,
Line 53, after "switch" insert -- circuit --.
Line 54, after "signals" delete "circuit".

Column 5,
Line 14, after "switch" insert -- circuit --.
Line 15, after "signals" delete "circuit".

Signed and Sealed this

First Day of October, 2002

Attest:

JAMES E. ROGAN
Attesting Officer         Director of the United States Patent and Trademark Office